(12) United States Patent
Pasqualoni et al.

(10) Patent No.: US 6,468,913 B1
(45) Date of Patent: Oct. 22, 2002

(54) READY-TO-USE STABLE CHEMICAL-MECHANICAL POLISHING SLURRIES

(75) Inventors: Anthony Mark Pasqualoni, Hamden; Deepak Mahulikar, Madison, both of CT (US)

(73) Assignee: Arch Specialty Chemicals, Inc., Norwalk, CT (US)

( * ) Notice: Subject to any disclaimer, the term of this patent is extended or adjusted under 35 U.S.C. 154(b) by 0 days.

(21) Appl. No.: 09/611,702

(22) Filed: Jul. 8, 2000

(51) Int. Cl.[7] ............................................. H01L 21/00
(52) U.S. Cl. ......................... 438/693; 106/20; 216/89; 252/79.2; 252/79.4; 252/79.5; 438/745
(58) Field of Search ................................. 438/690, 691, 438/692, 693, 745; 252/79.2, 79.5, 79.4, 79.3; 216/38, 88, 89; 106/20

(56) References Cited

U.S. PATENT DOCUMENTS 5,614,444 A * 3/1997 Farkas et al. ............... 438/693
5,980,775 A * 11/1999 Grumbine et al. ...... 438/693 X

OTHER PUBLICATIONS

Chemical–Mechanical Polishing of Copper in Glycerol Based Slurries (Materials Research Society Symposium Proceedings, 1996), Kumar et al.

"Chemical–Mechanical Polishing of Copper with Oxide and Polymer interlevel dielectrics" (Thin Solid Films, 1995) Gutman et al.

"Stabilization of Alumina Slurry for Chemical–Mechanical Polishiing of Copper" (Langmuri, 1996) Lou et al.

Initial Study on Copper MCP Slurry Chemistries (Thin Solid Films, 1995) Carpio et al.

Chemical–Mechanical Polishign of Copper for Interconnect Formation (Microelectronic Engineering, 1997) Stavreva et al.

"Development of a 1:1:1 Slurry for Tantalum Layer Polishing" in proceedings of the CMP–MIC conference, Feb. 1999.

* cited by examiner

Primary Examiner—William A. Powell
(74) Attorney, Agent, or Firm—Ohlandt, Greeley, Ruggiero & Perle, LLP

(57) ABSTRACT

In accordance with the invention, there is provided a chemical-mechanical polishing slurry for polishing a substrate. The slurry is comprised primarily of abrasive particles and an oxidizing agent, wherein the slurry exhibits a stability having a shelf life of at least 30 days.

37 Claims, 1 Drawing Sheet

READY-TO-USE STABLE CHEMICAL-MECHANICAL POLISHING SLURRIES

Figure 1:
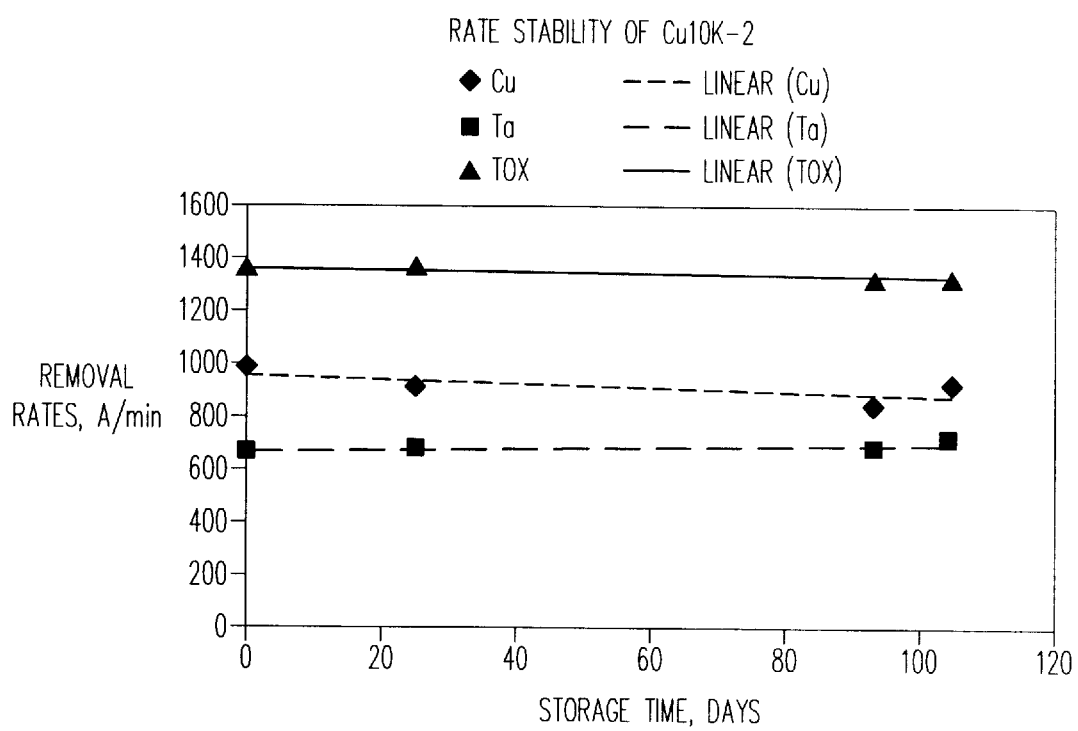

This invention relates generally to the chemical-mechanical polishing (CMP) of metal substrates on semiconductor wafers and slurry compositions therefor. In particular, the present invention relates to a stable CMP slurry composition containing a low concentration of abrasive particles. Particles of fumed silica were found to be helpful in stabilizing the hydrogen peroxide contained in the slurry composition when the slurry is stored prior to its use. An extension of this concept is to create a complete, ready-to-use, fumed silica CMP slurry that is stable over long-term storage at ambient conditions.

BACKGROUND OF THE INVENTION

Silicon based semiconductor devices, such as integrated circuits, typically include a silicon dioxide ($SiO_2$) dielectric layer. Multilevel circuit traces, typically formed from aluminum or an aluminum alloy, are patterned onto the $SiO_2$ substrate.

If the aluminum based circuit traces are replaced with copper based circuit traces, the density of circuit traces on the face of the device could be increased because copper has a higher electrical conductivity than aluminum enabling the use of circuit traces with a reduced cross-sectional area. In addition, the electromigration of copper is approximately 0.1 that of aluminum at a given temperature.

In order to use multilevel metals circuit traces, lithographic focus constraints require that the substrate surface be planar on both a global and local scale. If the surface is not planar, the exposure tool cannot be focused properly causing out of focus images and poor quality printing.

One way to fabricate planar copper circuit traces on a silicon dioxide substrate is referred to as the damascene process. In accordance with this process, the silicon dioxide dielectric surface is patterned by a conventional dry etch process to form holes and trenches for vertical and horizontal interconnects. The patterned surface is coated with an adhesion-promoting layer such as titanium or tantalum and/or a diffusion barrier layer such as titanium nitride or tantalum nitride. The adhesion-promoting layer and/or the diffusion barrier layer is then overcoated with copper. Chemical-mechanical polishing is next employed to reduce the thickness of the copper overlayer, as well as the thicknesses of any adhesion-promoting layer and/or diffusion barrier layer, until a planar surface that exposes elevated portions of the silicon dioxide surface is obtained. The vias and trenches remain filled with electrically conductive copper forming the circuit interconnects.

Previously, it was believed that the removal rate of the copper and the adhesion-promoting layer and/or the diffusion barrier layer must both greatly exceed the removal rate of silicon dioxide so that polishing effectively stops when elevated portions of the silicon dioxide are exposed. The ratio of the removal rate of copper to the removal rate of silicon dioxide base is called "selectivity." When high selectivity copper slurries are used, the copper layers are easily over-polished creating a depression or "dishing" effect in the copper vias and trenches. This feature distortion is unacceptable due to lithographic and other constraints in semiconductor manufacturing.

Another feature distortion that is unsuitable for semiconductor manufacturing is called "erosion." Erosion is the topography difference between a field of silicon oxide and a dense array of copper vias or trenches. In chemical-mechanical polishing, the materials in the dense array are removed or eroded at a faster rate than the surrounding field of silicon oxide. This causes a topography difference between the field of silicon oxide and the dense copper array. The industry standard for erosion is typically less than 500 Angstroms (Å).

A typically used chemical-mechanical polishing slurry has two actions, a chemical component and a mechanical component. An important consideration in slurry selection is "passive etch rate." The passive etch rate is the rate at which copper is dissolved by the chemical component alone and should be significantly lower than the removal rate when both the chemical component and the mechanical component are involved to prevent under-cutting of copper contained in the trenches and vias by contact with the chemical component. A large passive etch rate leads to dishing and thus, preferably, is less than 10 nanometers per minute.

A number of systems for chemical-mechanical polishing of copper have been disclosed. Kumar et al. in an article entitled "Chemical-Mechanical Polishing of Copper in Glycerol Based Slurries" (*Materials Research Society Symposium Proceedings*, 1996) disclose a slurry that contains glycerol and abrasive alumina particles. An article by Gutmann et al. entitled "Chemical-Mechanical Polishing of Copper with Oxide and Polymer Interlevel Dielectrics" (*Thin Solid Films*, 1995) discloses slurries based on either ammonium hydroxide or nitric acid that may contain benzotriazole (BTA) as an inhibitor of copper dissolution. Luo et al. in an article entitled "Stabilization of Alumina Slurry for Chemical-Mechanical Polishing of Copper" (*Langmuir*, 1996) discloses alumina-ferric nitrate slurries that contain polymeric surfactants and BTA. Carpio et al. in an article entitled "Initial Study on Copper CMP Slurry Chemistries" (*Thin Solid Films*, 1995) disclose slurries that contain either alumina or silica particles, nitric acid or ammonium hydroxide, with hydrogen peroxide or potassium permanganate as an oxidizer.

There are a number of theories as to the mechanism for chemical-mechanical polishing of copper. An article by Zeidler et al. (*Microelectronic Engineering*, 1997) proposes that the chemical component forms a passivation layer on the copper changing the copper to a copper oxide. The copper oxide has different mechanical properties, such as density and hardness, than metallic copper and passivation changes the polishing rate of the abrasive portion. The above article by Gutmann et al. discloses that the mechanical component abrades elevated portions of copper and the chemical component then dissolves the abraded material. The chemical component also passivates recessed copper areas minimizing dissolution of those portions.

While present day chemical-mechanical polishing systems are capable of removing a copper overlayer from a silicon dioxide substrate, the systems do not satisfy the rigorous demands of the semiconductor industry. These requirements can be summarized as follows. First, there is a need for high removal rates of copper to satisfy throughput demands. Secondly, there must be excellent topography uniformity across the substrate. Finally, the CMP method must minimize local dishing and erosion effects to satisfy ever increasing lithographic demands.

Presently, for metal CMP slurries to work, additions of certain chemical agents to increase the removal rates of the metal layers are necessary. ARCH Wacker has developed a basic slurry to do the CMP of the copper, tantalum and TEOS layers. This is described in a publication titled "Development of a 1:1:1 Slurry for Tantalum Layer Polishing" in the proceedings of the CMP-MIC conference, February 1999. This prior art slurry was made by mixing four components together; organic acid, inorganic oxidizer, aqueous abrasive dispersion, and corrosion inhibitor. These chemicals are required for purposes such as Cu corrosion prevention and the pH adjustment of the slurry to achieve the required rates on various metallic and non-metallic layers of the wafers. These components could, in theory, be combined in a dilute aqueous solution, which could be added to an aqueous dispersion containing abrasive particles, to form the finished slurry.

Prior art CMP metal slurries are typically two part mixtures consisting of a dispersion and an oxidizer. The dispersion comprises an abrasive, an acid to lower the pH to about 2 to 6, optionally a surfactant which maintains the abrasive in suspension and other chemicals tailored to the metal being polished. An example is a tungsten layer slurry called Biplanar® made by EKC. The dispersion is an acidic dispersion (approximately pH of 3, with 5 to 15% alumina particles). Acids reportedly used in the slurry include carboxylic acids or nitric acid. At the point of use, the dispersion is mixed with an oxidizer, such as hydrogen peroxide or ferric nitrate, to form the slurry that will be used to polish the metal layers.

Metal slurry manufacturers typically sell only the acidic dispersion while the customer buys the oxidizer independently and mixes the two parts at the point of use. In this case, the oxidizer is a standard bulk commodity solution that can be mixed with the different customized metal dispersion solutions. For copper CMP, the inorganic oxidizer is usually $H_2O_2$. In practice, the combination of the particular ingredients for the copper slurry described results in a solution which does not maintain its properties over a sufficiently long time (i.e., shelf life is short). In particular, it was found that the $H_2O_2$ was decomposing. This has the end result of changing the polishing performance of the slurry, resulting in an unstable process for the end user, and also creating a dangerous outgassing potential which could rupture sealed storage containers. In addition, it required the individual chemical components of the CMP slurry to be shipped and stored in separate containers until the slurry was made just prior to use. If the manufacturer does not forecast appropriately and the dispersion reaches its shelf life, then a large volume of dispersion may have to be disposed which is very expensive and environmentally unfriendly, causing additional complications to the end user.

SUMMARY OF THE INVENTION

The present invention provides a complete, ready-to-use CMP slurry that is stable over long term storage at ambient conditions. In accordance with the invention, there is provided a CMP slurry for polishing a substrate. The slurry comprises abrasive particles and an oxidizing agent, wherein the slurry exhibits a stability having a shelf life of at least 30 days.

The invention also provides a method to use this slurry in a CMP process that promotes high removal rates, low defect densities and reduced amounts of dishing and erosion.

FIG. 1 is a graph showing the removal rate stability of the composition according to the present invention.

DETAILED DESCRIPTION OF THE PREFERRED INVENTION

It has been found that combining silica ($SiO_2$) particles with hydrogen peroxide ($H_2O_2$) results in a more stable mixture than a solution without silica particles. Storing the mixture prior to its use enhances the stability of the mixture. This observation is opposite to the long-held assumption in the industry that particulate material in chemical solutions will serve to accelerate the decomposition of $H_2O_2$. Although metallic particles or species are known to cause decomposition, $SiO_2$ particles appear to have a stabilizing effect on $H_2O_2$ when the mixture is stored prior to its use. The slurry exhibits a pH stability of about 0.5 pH units from an initial pH of the slurry, over a period of about 14 days.

For the purpose of this patent application, the term "particle" includes, but is not limited to, colloids, aggregates and other fused combinations of particles, as well as agglomerates and other solely mechanically interwoven combinations of particles. "Diameter" is intended to mean the distance from one edge of a particle to a diametrically opposed edge notwithstanding the shape of the particle.

Ready-to-use CMP Slurry

The ready-to-use CMP slurry comprises silica particles and hydrogen peroxide. Optionally, other additives may be included. To further promote the stabilization and effective concentration of the hydrogen peroxide in the slurry, the ready-to-use CMP slurry is stored in its container for about 3 days to 21 days, prior to its use. As a result of the storage, the CMP slurry exhibits a stability having an effective shelf life of at least 30 days, at least 60 days, or at least 90 days.

The abrasive particles may be any material that is effective at removing metal and silica layers. Silica is the abrasive material used in the present invention. The silica may be, for example, colloidal silica, filmed silica and other silica dispersions, however, the preferred silica is fumed silica. Preferably, the silica is present in the slurry in a concentration of about 0.5% to 40% of the total weight of the slurry. More preferably, the silica is present in a concentration of about 1% to 20% of the total weight of the slurry. Most preferably, the silica is present in a concentration of about 1% to 15% of the total weight of the slurry.

In addition, other ceramics, such as, for example, alumina ($Al_2O_3$) and ceria ($CeO_2$) may also be utilized as an abrasive in the slurry composition.

$H_2O_2$ is used as the oxidizing agent in the present invention. Preferably the concentration of the $H_2O_2$ is from about 0.01% to 10% of the total weight of the slurry. When used with silica, the $H_2O_2$ is present in a concentration from about 0.03% to 4% of the total weight of the slurry.

Other suitable oxidizing agents may be utilized. For example, potassium ferricyanide, potassium dichromate, potassium iodate, potassium bromate, vanadium trioxide, hypochlorous acid, sodium hypochlorite, potassium hypochlorite, calcium hypochlorite, magnesium hypochlorite, ferric nitrate, various ammonium salts such as ammonium persulfate, $KMgO_4$, and mixtures there of, are suitable oxidizing agents.

Other chemicals that may be added to the CMP slurry composition include, for example, stabilizing agents, surfactants, acids, corrosion inhibitors, fluorine-containing compounds, chelating agents, amines, and salts.

In order to maintain the pH of the slurry composition, a stabilizing agent may be added so that the pH of the slurry is about 9 to 11, and more preferably, about 9 to 10. Suitable stabilizing agents include, for example, ammonium hydroxide and potassium hydroxide. These stabilizing agents may be present in the slurry in a concentration of about 0.001% to 1%, and more preferably in a concentration of about 0.01% to 0.10% of the total weight of the slurry.

Suitable surfactant compounds that may be added to the slurry composition include, for example, any of the numerous nonionic, anionic, cationic or amphoteric surfactants known to those skilled in the art. The surfactant compounds may be present in the slurry composition in a concentration of about 0.0001% to 1% and are preferably present in a concentration of about 0.001% to 0.1% of the total weight of the slurry. The preferred types of surfactants are nonionic, anionic, or mixtures thereof and are most preferably present in a concentration of about 10 ppm to 50 ppm of the total weight of the slurry.

Suitable acid compounds that may be added to the slurry composition include, for example, formic acid, acetic acid, propanoic acid, butanoic acid, pentanoic acid, hexanoic acid, heptanoic acid, octanoic acid, nonanoic acid, lactic acid, hydrochloric acid, nitric acid, phosphoric acid, sulfuric acid, hydrofluoric acid, malic acid, tartaric acid, gluconic acid, citric acid, phthalic acid, pyrocatechoic acid, pyrogallol carboxylic acid, gallic acid, tannic acid, and mixtures thereof. These acid compounds may be present in the slurry composition in a concentration of about 0.01% to 10% of the total weight of the slurry. The preferred acid is propanoic acid, most preferably in a concentration of about 0.10% to 7% of the total weight of the slurry.

Suitable corrosion inhibitors that may be added to the slurry composition include , for example, benzotriazole, 6-tolylytriazole, 1-(2,3-dicarboxypropyl)benzotriazole, and mixtures thereof The corrosion inhibitor may be present in the slurry in a concentration of about 1 ppm to 300 ppm and is preferably present in a concentration of about 50 ppm to 200 ppm of the total weight of the slurry. The preferred corrosion inhibitor is benzotriazole and is most preferably present in a concentration of about 50 ppm to 150 ppm of the total weight of the slurry.

Carboxylic acids, if added, may also impart corrosion inhibition properties to the slurry composition.

To increase the selectivity of tantalum and tantalum compounds relative to silicon dioxide, fluorine-containing compounds may be added to the slurry composition. Suitable fluorine-containing compounds include, for example, hydrogen fluoride, perfluoric acid, alkali metal fluoride salt, alkaline earth metal fluoride salt, ammonium fluoride, tetramethylammonium fluoride, ammonium bifluoride, ethylenediammonium difluoride, diethylenetriammonium trifluoride, and mixtures thereof. The fluorine-containing compounds may be present in the slurry composition in a concentration of about 0.01% to 5%, and are preferably present in a concentration of about 0.10% to 2% of the total weight of the slurry. The preferred fluorine-containing compound is ammonium fluoride, most preferably in a concentration from about 0.10% to 1% of the total weight of the slurry.

Suitable chelating agents that may be added to the slurry composition include, for example, ethylenediaminetetracetic acid (EDTA), N-hydroxyethylethylenediaminetriacetic acid (NHEDTA), nitrilotriacetic acid (NTA), diethylklenetriaminepentacetic acid (DPTA), ethanoldiglycinate, and mixtures thereof. The chelating agents may be present in the slurry composition in a concentration of about 0.01% to 1%, and are preferably present in a concentration of about 0.05% to 0.20% of the total weight of the slurry. The preferred chelating agent is EDTA and is most preferably present in a concentration of about 0.05% to 0.20% of the total weight of the slurry.

Suitable amines that may be added to the slurry composition include, for example, hydroxylamine, monoethanolamine, diethanolamine, triethanolamine, diethyleneglycolamine, N-hydroxylethylpiperazine, and mixtures thereof. The amines may be present in the slurry composition in a concentration of about 0.01% to 1%, and are preferably present in a concentration of about 0.01% to 0.20% of the total weight of the slurry. The preferred amine is ammonium hydroxide and is most preferably present in a concentration of about 0.01% to 0.1% of the total weight of the slurry.

Suitable salts that may be added to the slurry composition include, for example, ammonium persulfate, potassium persulfate, potassium sulfite, potassium carbonate, ammonium nitrate, potassium hydrogen phthalate, hydroxylamine sulfate, and mixtures thereof. The salts may be present in the slurry composition in a concentration of about 0.01% to 10%, and are preferably present in a concentration of about 0.02% to 5% of the total weight of the slurry. The preferred salt is ammonium nitrate and is most preferably present in a concentration of about 0.05% to 0.15% of the total weight of the slurry.

The CMP method of the present invention involves a two step process wherein the ready-to-use CMP slurry is employed in the second step to polish a substrate with at least one metal layer. The CMP method reduces the amount of dishing, erosion, and recess as compared to a process employing a high copper removal rate slurry alone in a single step.

The substrate polishing process comprises the steps of: providing a substrate with at least one metal layer, applying the ready-to-use CMP slurry comprising fumed silica and $H_2O_2$ to the substrate, wherein the slurry has been stored for at least 3 days prior to its use, and chemically-mechanically polishing the substrate with the slurry.

The present invention is further demonstrated by the examples below.

EXAMPLE 1

The following example shows comparisons of "neat" versus $SiO_2$-containing activator solutions. The solutions that contain $SiO_2$ have concentrations of 1 wt. % $SiO_2$. It can be seen that the $H_2O_2$ concentration is more stable in the mixtures that contain fumed $SiO_2$ particles than those mixtures that contain no particles ("neat").

$H_2O_2$ Concentration (wt %) vs. Storage Time
"Neat" Activators (No $SiO_2$)
  Concentrate:
    Organic acid (propanoic acid): 20.046%
    Corrosion inhibitor (BTA): 0.536%
    30% $H_2O_2$ solution: 79.413%
  Dilute:
    Organic acid (propanoic acid): 1.121%
    Corrosion inhibitor (BTA): 0.030%
    30% $H_2O_2$ solution: 4.447%
    Water: 94.4%

| Days:       | 0     | 1     | 2    | 6    |
|-------------|-------|-------|------|------|
| Concentrate | 25.64 | 25.42 | 25.5 | 13.9 |
| Dilute      | 1.24  | 1.23  | 1.27 | 0.99 |

These mixtures showed peroxide degradation after 6 days of storage at ambient temperature. In the concentrate, the decomposition was severe enough to cause pressurization of the holding container.

Activators Containing 1% $SiO_2$
  Organic acid (propanoic acid): 1.121%
  Corrosion inhibitor (BTA): 0.030%
  30% $H_2O_2$ solution: 4.447%

SiO2: 1% (as pre-dispersed fumed silica)
Water: 93.4%

| Days: | 0 | 24 | 45 | 63 |
|---|---|---|---|---|
| Sample A | 1.27 | 1.26 | 1.26 | 1.267 |
| Sample B | 1.21 | 1.22 | 1.23 | 1.266 |

These mixtures showed improved peroxide stability compared to the previous mixtures, which did not contain $SiO_2$ particles. No pressurization of containers was noted.

EXAMPLE 2

A slurry consisting of the following components was mixed and tested for removal rates over time:
Cu10K-2 CMP Slurry
   35 10% fumed $SiO_2$ stabilized with KOH,
   0.2% $H_2O_2$,
   0.005% BTA
   remainder R.O. water.

The removal rates on the various materials are shown in the graph set forth in FIG. 1. It can be seen that the rates remain stable over a period of at least 3 months.

The analysis of $H_2O_2$ remaining in the slurry shows that it has declined only marginally since it was mixed into the slurry.

While the invention has been described in combination with embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

What is claimed is:

1. A chemical mechanical polishing slurry composition comprising:
   an abrasive selected from the group consisting of: silica, alumina, ceria, and mixtures thereof; and
   an oxidizing agent selected from the group consisting of: hydrogen peroxide, potassium ferracyanide, potassium dichromate, potassium iodate, potassium bromate, vanadium trioxide, hypochlorous acid, sodium hypochlorite, potassium hypochlorite, calcium hypochlorite, magnesium hypochlorite, ferric nitrate, ammonium persulfate, potassium permanganate, and mixtures thereof;
   wherein said slurry has an effective shelf life of at least 30 days.

2. The composition of claim 1, wherein said slurry exhibits a pH stability of about 0.5 pH units from an initial pH of said slurry, over a period of about 14 days.

3. The composition of claim 1, wherein said abrasive is silica present in an amount between about 1% to 20% based on the total weight of said slurry.

4. The composition of claim 1, wherein said silica is fumed silica.

5. The composition of claim 1, wherein said oxidizing agent is hydrogen peroxide.

6. The composition of claim 1, wherein said effective shelf life is at least 60 days.

7. The composition of claim 1, wherein said effective shelf life is at least 90 days.

8. The composition of claim 1, further comprising an acid present in an amount between about 0.10% to 7% based on the total weight of said slurry.

9. The composition of claim 8, wherein said acid is selected from the group consisting of: formic acid, acetic acid, propanoic acid, butanoic acid, pentanoic acid, hexanoic acid, heptanoic acid, octanoic acid, nonanoic acid, lactic acid, hydrochloric acid, nitric acid, phosphoric acid, sulfuric acid, hydrofluoric acid, malic acid, tartaric acid, gluconic acid, citric acid, phthalic acid, pyrocatechoic acid, pyrogallol carboxylic acid, gallic acid, tannic acid, and mixtures thereof.

10. The composition of claim 1, further comprising a corrosion inhibitor present in an amount between about 50 ppm to 200 ppm based on the total weight of said slurry.

11. The composition of claim 10, wherein said corrosion inhibitor is selected from the group consisting of: benzotriazole, 6-tolylytriazole, 1-(2,3,dicarboxypropyl) benzotriazole, and mixtures thereof.

12. The composition of claim 11, wherein said corrosion inhibitor is benzotriazole.

13. The composition of claim 1, further comprising a surfactant present in an amount between about 10 ppm to 50 ppm, based on the total weight of said slurry.

14. The composition of claim 13, wherein said surfactant is selected from the group consisting of: nonionic, anionic, cationic, amphoteric surfactants, and mixtures thereof.

15. The composition of claim 1, further comprising a stabilizing agent present in an amount between about 0.001% to 1% based on the total weight of said slurry.

16. The composition of claim 15, wherein said stabilizing agent is selected from the group consisting of: potassium hydroxide, ammonium hydroxide, and mixtures thereof.

17. The composition of claim 1, further comprising optional additives selected from the group consisting of: amines, fluorine-containing compounds, chelating agents, salts, and mixtures thereof.

18. The composition of claim 17, wherein said amine is selected from the group consisting of: hydroxylamine, monoethanolamine, diethanolamine, triethanolamine, diethyleneglycolamine, N-hydroxylethylpiperazine, and mixtures thereof.

19. The composition of claim 17, wherein said fluorine-containing compound is selected from the group consisting of: hydrogen fluoride, perfluoric acid, alkali metal fluoride salt, alkaline earth metal fluoride salt, ammonium fluoride, tetramethylammonium fluoride, ammonium bifluoride, ethylenediammonium difluoride, diethylenetriammonium trifluoride, and mixtures thereof.

20. The composition of claim 17, wherein said chelating agent is selected from the group consisting of: ethylenediaminetetracetic acid, N-hydroxyethylethylenediaminetriacetic acid, nitrilotriacetic acid, diethylklenetriaminepentacetic acid, ethanoldiglycinate, and mixtures thereof.

21. The composition of claim 17, wherein said salts are selected from the group consisting of: ammonium persulfate, ammonium nitrate, potassium persulfate, potassium sulfite, potassium carbonate, potassium hydrogen phthalate, hydroxylamine sulfate, and mixtures thereof.

22. The composition of claim 1, wherein the pH of said composition is between about 9 to 11.

23. The composition of claim 1, wherein the pH of said composition is between about 9 to 10.

24. A chemical mechanical polishing slurry composition comprising:
   an abrasive selected from the group consisting of: silica, alumina, ceria, and mixtures thereof;
   an oxidizer selected from the group consisting of: hydrogen peroxide, potassium ferracyanide, potassium dichromate, potassium iodate, potassium bromate, vanadium trioxide, hypochlorous acid, sodium hypochlorite, potassium hypochlorite, calcium hypochlorite, magnesium hypochlorite, ferric nitrate, ammonium persulfate, potassium permanganate, and mixtures thereof;

an acid;

a corrosion inhibitor;

a stabilizing agent; and water;

wherein said slurry has an effective shelf life of at least 30 days.

25. A method of polishing a substrate, comprising the steps of:
(a) providing a substrate with at least one metal layer;
(b) applying a slurry composition comprising: (1) an abrasive selected from the group consisting of: silica, alumina, ceria, and mixtures thereof; and (2) an oxidizer selected from the group consisting of: hydrogen peroxide, potassium ferracyanide, potassium dichromate, potassium iodate, potassium bromate, vanadium trioxide, hypochlorous acid, sodium hypochlorite, potassium hypochlorite, calcium hypochlorite, magnesium hypochlorite, ferric nitrate, ammonium persulfate, potassium permanganate, and mixtures thereof; wherein said slurry has an effective shelf life of at least 30 days; and
(c) chemically mechanically polishing said substrate with said slurry.

26. The method of claim 25, wherein said slurry exhibits a pH stability of about 0.5 pH units from an initial pH of said slurry, over a period of about 14 days.

27. The method of claim 25, wherein said slurry is stored for about 3 days to about 21 days prior to use in step (b).

28. The method of claim 25, wherein said effective shelf life is at least 60 days.

29. The method of claim 25, wherein said effective shelf life is at least 90 days.

30. A method of preparing a chemical mechanical polishing slurry which comprises the steps of:
admixing an abrasive selected from the group consisting of silica, alumina, ceria, and mixtures thereof, with an oxidizer selected from the group consisting of hydrogen peroxide, potassium ferracyanide, potassium dichromate, potassium iodate, potassium bromate, vanadium trioxide, hypochlorous acid, sodium hypochlorite, potassium hypochlorite, calcium hypochlorite, magnesium hypochlorite, ferric nitrate, ammonium persulfate, potassium permanganate, and mixtures thereof to form said slurry; and
storing said slurry prior to use, wherein said slurry has an effective shelf life of at least 30 days.

31. The method of claim 30, wherein said slurry exhibits a pH stability of about 0.5 pH units from an initial pH of said slurry, over a period of about 14 days.

32. The method of claim 30, where said slurry is stored for about 3 days to about 21 days prior to use.

33. The method of claim 30, wherein said abrasive is silica present in an amount between about 1% to 15% based on the total weight of said slurry.

34. The method of claim 33, wherein said silica is fumed silica.

35. The method of claim 30, wherein said oxidizer is hydrogen peroxide.

36. The method of claim 30, wherein said effective shelf life is at least 60 days.

37. The method of claim 30, wherein said effective shelf life is at least 90 days.

* * * * *